(12) United States Patent
Meyer

(10) Patent No.: US 11,726,569 B2
(45) Date of Patent: Aug. 15, 2023

(54) MULTI RATE PROCESSING DEVICE FOR RENDERING HAPTIC FEEDBACK

(71) Applicant: Tanvas, Inc., Chicago, IL (US)

(72) Inventor: David J. Meyer, Chicago, IL (US)

(73) Assignee: Tanvas Magic Inc., Surfside, FL (US)

( * ) Notice: Subject to any disclaimer, the term of this patent is extended or adjusted under 35 U.S.C. 154(b) by 205 days.

(21) Appl. No.: 17/367,685

(22) Filed: Jul. 6, 2021

(65) Prior Publication Data

US 2021/0333881 A1 Oct. 28, 2021

Related U.S. Application Data

(63) Continuation of application No. 16/824,015, filed on Mar. 19, 2020, now Pat. No. 11,086,402, which is a continuation of application No. 15/937,403, filed on Mar. 27, 2018, now Pat. No. 10,606,357.

(60) Provisional application No. 62/477,810, filed on Mar. 28, 2017.

(51) Int. Cl.
| | |
|---|---|
| *G06F 3/01* | (2006.01) |
| *G06F 3/041* | (2006.01) |
| *G06F 8/38* | (2018.01) |
| *G06F 9/4401* | (2018.01) |

(52) U.S. Cl.
CPC .............. *G06F 3/016* (2013.01); *G06F 3/041* (2013.01); *G06F 8/38* (2013.01); *G06F 9/4411* (2013.01); *G06F 2203/04105* (2013.01)

(58) Field of Classification Search
CPC ................................ G06F 3/016; G06F 9/4411
See application file for complete search history.

(56) References Cited

U.S. PATENT DOCUMENTS

| | | | | |
|---|---|---|---|---|
| 7,182,691 | B1* | 2/2007 | Schena | G06F 3/016 |
| | | | | 345/161 |
| 9,400,557 | B2* | 7/2016 | Baskaran | G06F 3/016 |
| 10,152,128 | B2* | 12/2018 | Cruz-Hernandez | G06F 3/016 |
| 2011/0241852 | A1* | 10/2011 | Braun | G05G 9/047 |
| | | | | 340/407.2 |
| 2013/0278400 | A1 | 10/2013 | Harris | |
| 2014/0092003 | A1* | 4/2014 | Liu | G06F 3/016 |
| | | | | 345/156 |

(Continued)

FOREIGN PATENT DOCUMENTS

| | | |
|---|---|---|
| JP | 2016-031723 | 3/2016 |
| WO | 2001033760 | 5/2001 |
| WO | 2014129753 | 8/2014 |

OTHER PUBLICATIONS

PCT International Preliminary Report on Patentability and Written Opinion dated Oct. 10, 2019; filed in International Application No. PCT/US2018/024863; 12 pgs.

(Continued)

*Primary Examiner* — Patrick F Marinelli
(74) *Attorney, Agent, or Firm* — Vedder Price P.C.

(57) ABSTRACT

A haptic interface unit may include an application in the operating system of a device in communication with a driver layer. A plurality of sensors and actuators may be in communication with the driver layer. The driver layer analyzes information from the sensors to generate an output signal based on an interaction model stored in the driver layer. The application updates the interaction model in the driver layer.

9 Claims, 9 Drawing Sheets

(56) References Cited

U.S. PATENT DOCUMENTS

| | | | |
|---|---|---|---|
| 2015/0378434 A1* | 12/2015 | Baskaran | G06F 3/016 |
| | | | 345/156 |
| 2016/0011664 A1* | 1/2016 | Silvanto | G06F 3/03547 |
| | | | 345/156 |
| 2016/0162027 A1* | 6/2016 | Cruz-Hernandez | G08B 6/00 |
| | | | 340/407.2 |
| 2016/0246376 A1* | 8/2016 | Birnbaum | G06F 3/0488 |
| 2017/0045944 A1 | 2/2017 | Cruz-Hernandez et al. | |
| 2017/0147069 A1* | 5/2017 | Cruz-Hernandez | |
| | | | G06F 3/0488 |
| 2018/0136731 A1* | 5/2018 | Cruz-Hernandez | |
| | | | G06F 3/0488 |
| 2018/0284895 A1* | 10/2018 | Meyer | G06F 3/016 |
| 2018/0321748 A1* | 11/2018 | Rao | G06F 3/0414 |
| 2018/0335848 A1* | 11/2018 | Moussette | G06F 3/04842 |
| 2018/0373334 A1* | 12/2018 | Birnbaum | G06F 3/038 |
| 2020/0218357 A1* | 7/2020 | Meyer | G06F 8/38 |
| 2021/0333881 A1* | 10/2021 | Meyer | G06F 8/38 |

OTHER PUBLICATIONS

International Search Report dated Jul. 12, 2018 issued in connection with PCT/US2018/024863, 5 pages.

Written Opinion dated Jul. 12, 2018 issued in connection with PCT/US2018/024863, 10 pages.

\* cited by examiner

PRIOR ART   Fig. 3

MULTI RATE PROCESSING DEVICE FOR RENDERING HAPTIC FEEDBACK

CROSS-REFERENCE TO RELATED APPLICATIONS

This application is a continuation of and claims benefit of and priority from U.S. application Ser. No. 16/824,015, filed Mar. 19, 2020, which claims the benefit of and priority from U.S. application Ser. No. 15/937,403, filed Mar. 27, 2018 and issued as U.S. Pat. No. 10,606,357 on Mar. 31, 2020, which claims the benefit of and priority to U.S. Prov. App. No. 62/477,810, filed Mar. 28, 2017, the contents of which are hereby fully incorporated herein by reference.

BACKGROUND OF THE DISCLOSURE

The present disclosure generally relates to haptics. More particularly, the present disclosure relates to a haptic interface and control system.

Touchscreens have become ubiquitous for computer interface, and are used in mobile phones, tablets, laptop computers, bank kiosks, and many other applications and devices. Touchscreens are able to detect the location of a user's finger in contact with the screen. The detected location then can be used by a computer program to respond to the user's command as expressed by his or her touch, such as to move a graphical object that is visible on the screen or to select a button or menu item.

Usually the touch sensitive screen is transparent and is combined with a visual display so that the user may imagine that he or she is touching or pointing to the objects that are visually portrayed. There are two flows of information involved: visual information from a computer to the user, and touch information from the user to a computer.

Less common is the other direction of conveyance of touch information, in which the user can employ his or her sense of touch to receive information from a computer. This could support the user's perception of edges or textures, or even apparent bumps or depressions of the surface.

The facility to convey touch information to the user is called haptics. A contemporary form of haptics is accomplished by producing vibrations of a handheld device. A user may imagine the vibrations to be originating in his or her interaction with icons or other graphical features portrayed on a visual display. Going beyond vibrational haptics, the term surface haptic display refers to touchscreens in which forces can be generated by the screen and exerted on the user's fingertip at the point that it contacts the screen.

BRIEF SUMMARY OF THE INVENTIVE CONCEPTS

This summary is provided to introduce a selection of concepts in a simplified form that are further described in the detailed description of the disclosure. This summary is not intended to identify key or essential inventive concepts of the claimed subject matter, nor is it intended for determining the scope of the claimed subject matter.

Generally, a haptic interface unit as disclosed herein may include an application, driver layer, sensors, actuators, and an interface model.

BRIEF DESCRIPTION OF THE SEVERAL VIEWS OF THE DRAWING

The foregoing summary, as well as the following detailed description of the disclosure, is better understood when read in conjunction with the appended drawings. For the purpose of illustrating the disclosure, exemplary constructions of the inventive concepts of the disclosure are shown in the drawings. However, the disclosure and the inventive concepts herein are not limited to the specific methods and instrumentalities disclosed herein.

DETAILED DESCRIPTION OF THE DISCLOSURE

Figure 1:
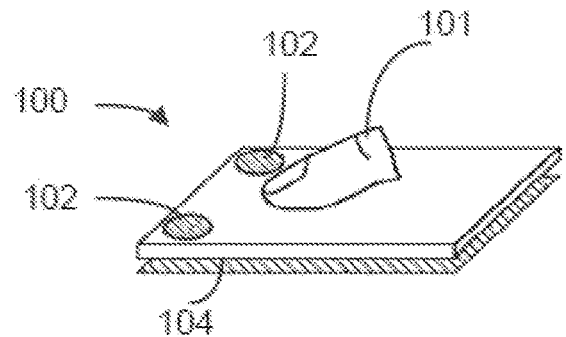
FIG. 1 depicts a haptic surface with sensors and actuators.

The following disclosure as a whole may be best understood by reference to the provided detailed description when read in conjunction with the accompanying drawings, drawing description, abstract, background, summary and associated headings. Identical reference numerals when found on different figures identify the same elements or a functionally equivalent element. The elements listed in the abstract are not referenced but nevertheless refer by association to the elements of the detailed description and associated disclosure.

At the core of a haptic system lies a fundamental model of interaction. The interaction model defines the actuator response to user input and is often a real-time simulation of a virtual environment. In the example of key-press feedback, the interaction model computes an output vibration waveform response to a touch pressure detection. One issue with rendering a haptic interaction model involves the time required to communicate the input, calculate the haptic output, and then deliver the output signal. Delays in delivering the haptic output signal can degrade the haptic experience. Therefore, the need exists for a method of conveying a haptic output to a user in an efficient manner.

Haptic designers have long realized the importance of update rates in a haptic interface unit, and because of this observation have used real-time operating systems (RTOS) to compute haptic interface or interaction simulations. RTOS environments are not typically implemented in consumer-grade devices that run full operating systems to service a wide variety of applications. In most consumer-grade devices, haptic interaction models are implemented in software, and are therefore rate-limited by the resources available in the operating system (OS).

Haptic interfaces that rely on OS-level processes to render interactions are prone to a few systemic failures. First, the timing of events is typically not guaranteed, and unsteady latencies in systems can be confusing to a user's haptic perception system. Second, software can often freeze, and in doing so can block haptic feedback processes. Both failures break the illusion that the haptic interface is representing a physical system because they present inconsistencies to the user.

Embodiments of the present invention provide technological improvements to enable the provision of a realistic haptic interface without requiring the use of a RTOS environment. By employing specialized, dedicated hardware and/or software, embodiments of the present invention provide low latency, guaranteed timing of events and enable a consistent user experience even when faced with software failures at the application level. In particular, changes to the driver layer are technological improvements that enable real-time haptic feedback in a way that was not possible with the prior art software implementations.

In one aspect of the present disclosure, an embodiment of a haptic interface unit may include an application in the operating system of a device in communication with a driver layer. A plurality of sensors and actuators may be in communication with the driver layer. The driver layer analyzes information from the sensors to generate an output signal based on an interaction model stored in the driver layer. The application updates the interaction model in the driver layer.

In other aspects of the present disclosure, an embodiment of a haptic interface unit may include an application in the operating system of a device and a tactile processing unit (TPU) in communication with the application. A plurality of sensors and actuators may be in communication with the TPU. The TPU analyzes information from the sensors to generate an output signal based on an interaction model stored in the TPU. In another embodiment, the application may asynchronously update the interaction model in the TPU.

FIG. 1 depicts a haptic surface 100 with sensors 104 and actuators 102. The actuators 102 are used to convey a haptic effect to an object in contact with the surface, such as, for example a finger 101. The actuators 102 may be any known actuator 102 including, but not limited to, an ultrasonic actuator that generates a vibration across the surface, an electrostatic actuator that generates an electrostatic force against the object or any other known actuator or structural item or assembly that facilitates providing the same or similar functionality. The sensors 104 (one of skill in the art will recognize that a field of sensors 104 is depicted rather than individual sensors that constitute such an array for the sake of brevity and clarity) are used to identify the position of an object 101 on the haptic surface. The location of the object 101 on the haptic surface 100 is used to deliver the haptic signal to the object 101. In an example embodiment, the sensors 104 and actuators 102 may be implemented with the same set of transparent conducting electrodes on the haptic surface 100 of a touch panel.

Figure 2:
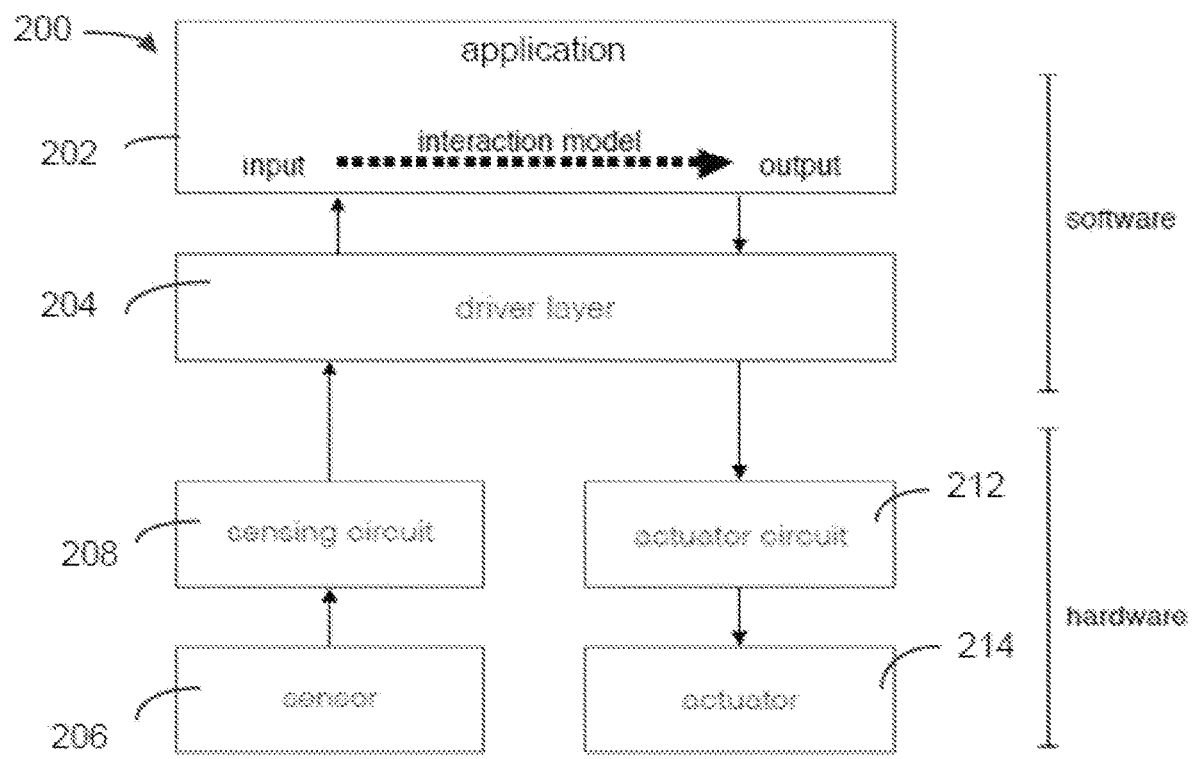
FIG. 2 schematically depicts a prior art haptic interface using a single-rate processing architecture.

FIG. 2 schematically depicts a prior art haptic interface 200 using a single-rate processing architecture. The haptic interface 200 includes an application 202 operating in the memory of a computing device, such as a mobile phone or laptop. The application 202 includes and operates an interaction model that determines a haptic output based on a sensor input, for example, the interaction model may be a spatial mapping that changes surface friction based on touch location. In one embodiment, the application 202 operates in the operating system of a device. The application 202 receives sensor information from driver layer 204 that is communicatively coupled to a sensor 206 by a sensing circuit 208. The driver layer 204 is also communicatively coupled to an actuator 214 by an actuator circuit 212. The driver layer 204 acts to gather the sensor information and format the information for delivery to the application. The application 202 processes the sensor data and provides an output to the driver layer 204 so that the driver layer may dispatch a signal to manipulate (e.g., selectively activating and deactivating) the actuator 214 via the actuator circuit 212 in order to generate the haptic output.

Figure 3:
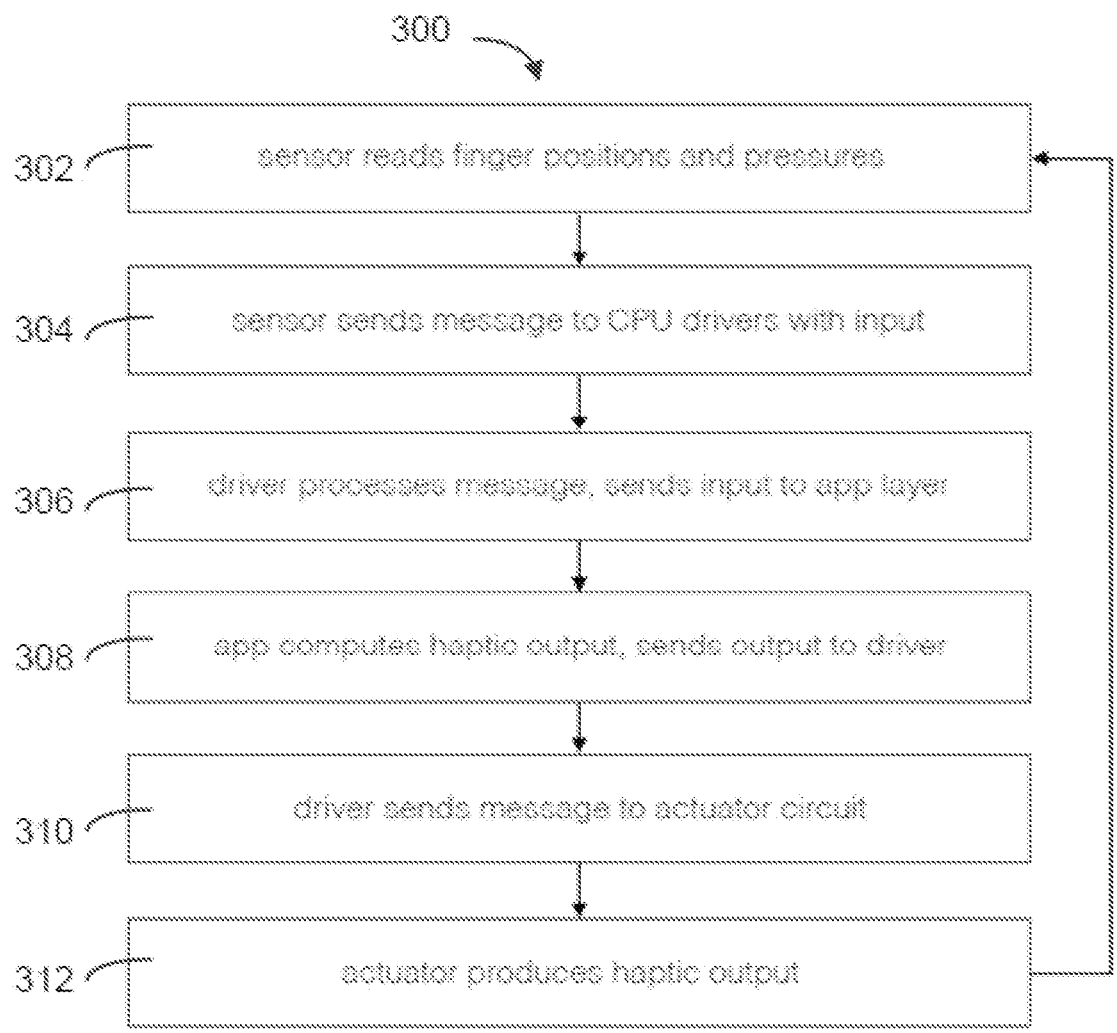
FIG. 3 depicts a schematic diagram of the operation of a process executed by the haptic interface of FIG. 2.

FIG. 3 depicts a schematic diagram of the operation of a haptic control loop 300 operating on the haptic interface 200 shown in FIG. 2. In step 302, the sensor 206 reads the position and applied force (such as pressure of a finger 101, or other object) in contact with the haptic surface 100. In step 304, the sensor 206 transmits the read position and force to the driver layer 204 via the sensing circuit 208. In step 306, the driver layer 204 receives the information from the sensing circuit 208 and formats the information for processing by the application 202 before sending the information to the application 202. In step 308, the application 202 computes a haptic output signal based on the information received by the sensor 206 and sends the haptic output signal to the driver layer 204 for processing. In step 310, the driver layer 204 formats the haptic output signal and sends the signal to the actuator circuit 212. In step 312, the actuator 214 receives the haptic output signal from the actuator circuit 212 and generates the haptic output. In this haptic control loop, several steps are scheduled by the operating system. Because most operating systems cannot guarantee timing of scheduling, the haptic control loop is subject to varying amounts of jitter and lag that cannot be predicted, and user experience is negatively affected.

Figure 4:
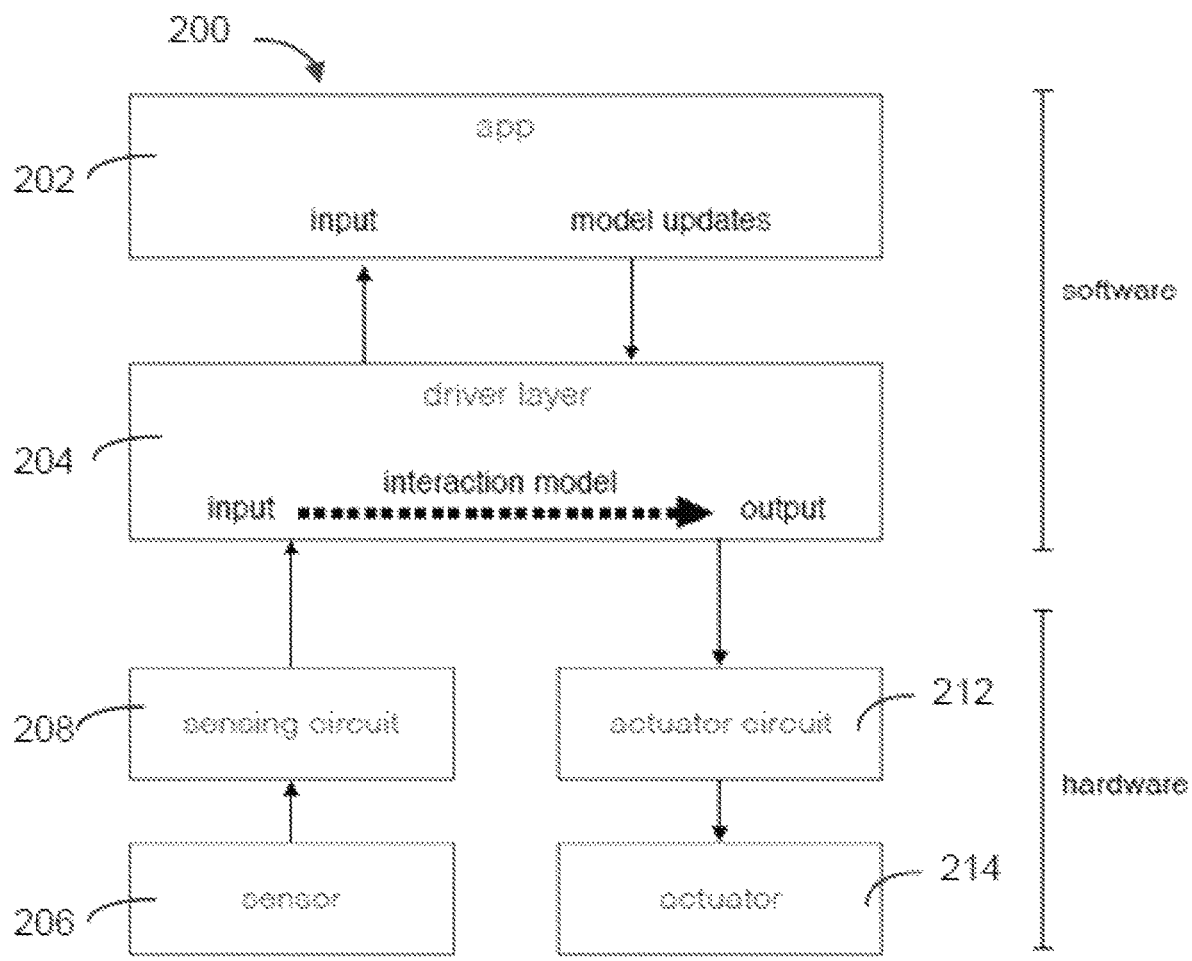
FIG. 4 schematically depicts an embodiment of a haptic interface unit consistent with the present disclosure, using a multi-rate processing unit built with driver-layer software.

FIG. 4 schematically depicts an embodiment of a haptic interface unit 200 consistent with the present disclosure, using a multi-rate tactile processing unit. The haptic interface 200 includes the application 202, driver layer 204, sensor 206, sensing circuit 208, actuator circuit 212 and actuator 214. Consistent with this embodiment, the application 202 interacts with the driver layer 204 to update and store interaction models on the driver layer 204 such that the driver layer 204 analyzes and generates the haptic output signal to the actuator 214 via the actuator circuit 212, without interfacing with the application, in order to generate the haptic output. After the generation of the haptic output signal from the driver layer 204, the driver layer 204 sends the sensor information to the application 202 and the application updates the interaction model in the driver layer 204. The tactile processing unit is implemented in the driver layer software and is immune to application-level operating system scheduling.

Figure 5:
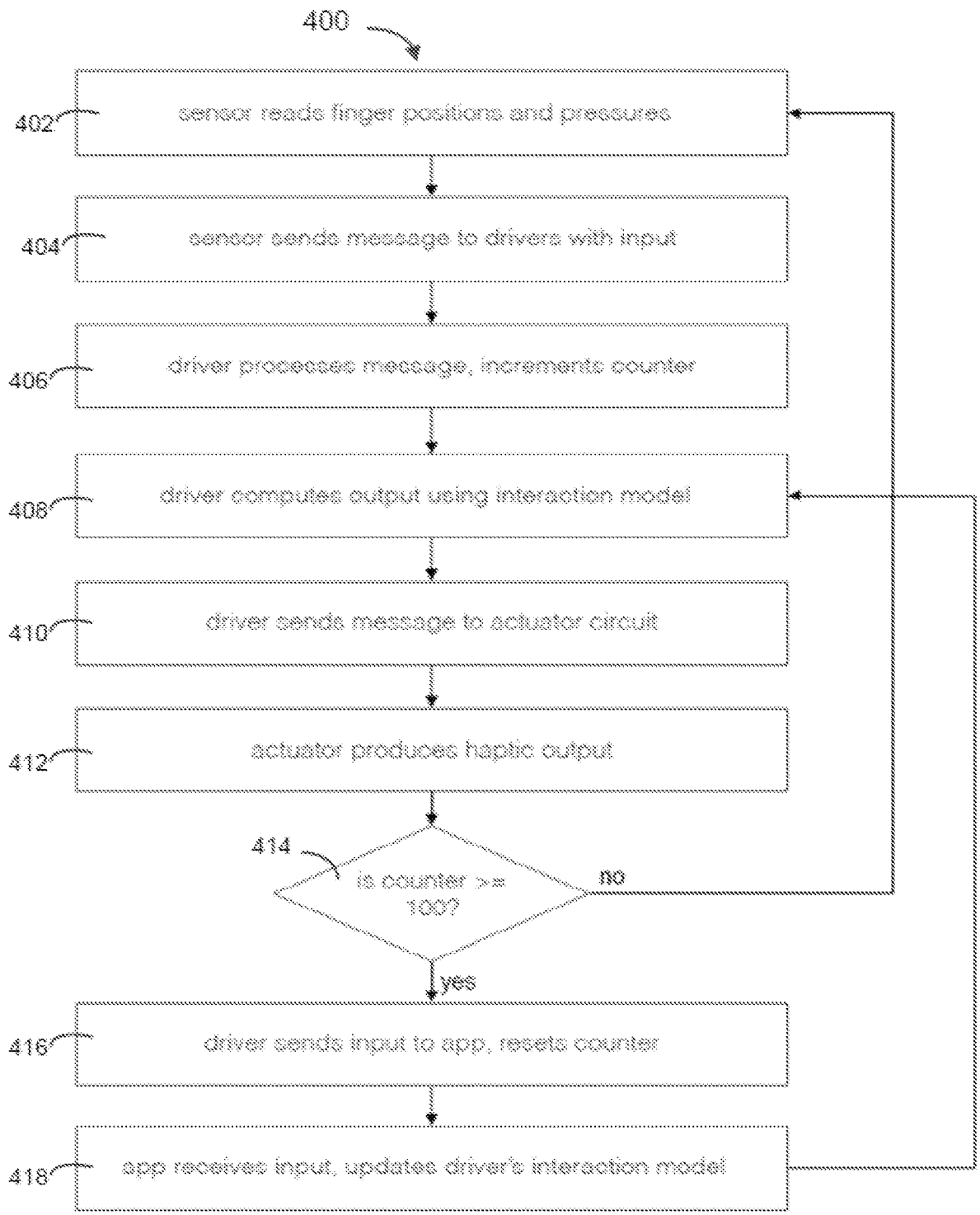
FIG. 5 depicts a schematic diagram of the operation of a process executed by the haptic interface unit of FIG. 4.

FIG. 5 depicts a schematic representation of a process executed by the haptic interface unit 400 of FIG. 4. In step 402, the sensor 206 reads finger positions and/or pressures. In step 404, the sensor 206 transmits the positions and/or pressures via the sensor circuitry 208 to the driver layer 204. In step 406, the driver layer 204 processes the positions and/or pressures and increments a counter. In step 408, the driver layer 204 computes a haptic output signal based on interaction models stored in the driver layer 204. In step 410, the driver layer 204 sends the haptic output signal output to the actuator circuitry 212. In step 412, the actuator circuitry 212 sends the haptic output signal to the actuator that produces the haptic output.

In step 414, the driver layer 204 determines if the counter is greater than or equal to a predetermine number, such as 100. In 416, if the counter exceeds the predetermined number, the driver sends the positions and pressures read from the sensor 206 to the application 202. If the counter is less than the predetermined number, the driver layer 204 reads additional information (e.g., finger/object positions, pressures/forces, etc.) from the sensor 206. In step 418, the application 202 receives the position and/or pressure information and updates the interaction models stored in the driver layer 204.

The process depicted in FIG. 5 is preferably implemented by a multi-rate processing architecture that does not involve application-layer messages in the rendering of haptic output and is therefore immune to operating system delays. Step 416 may be executed inside the application and is therefore asynchronous from step 408.

Figure 6A:
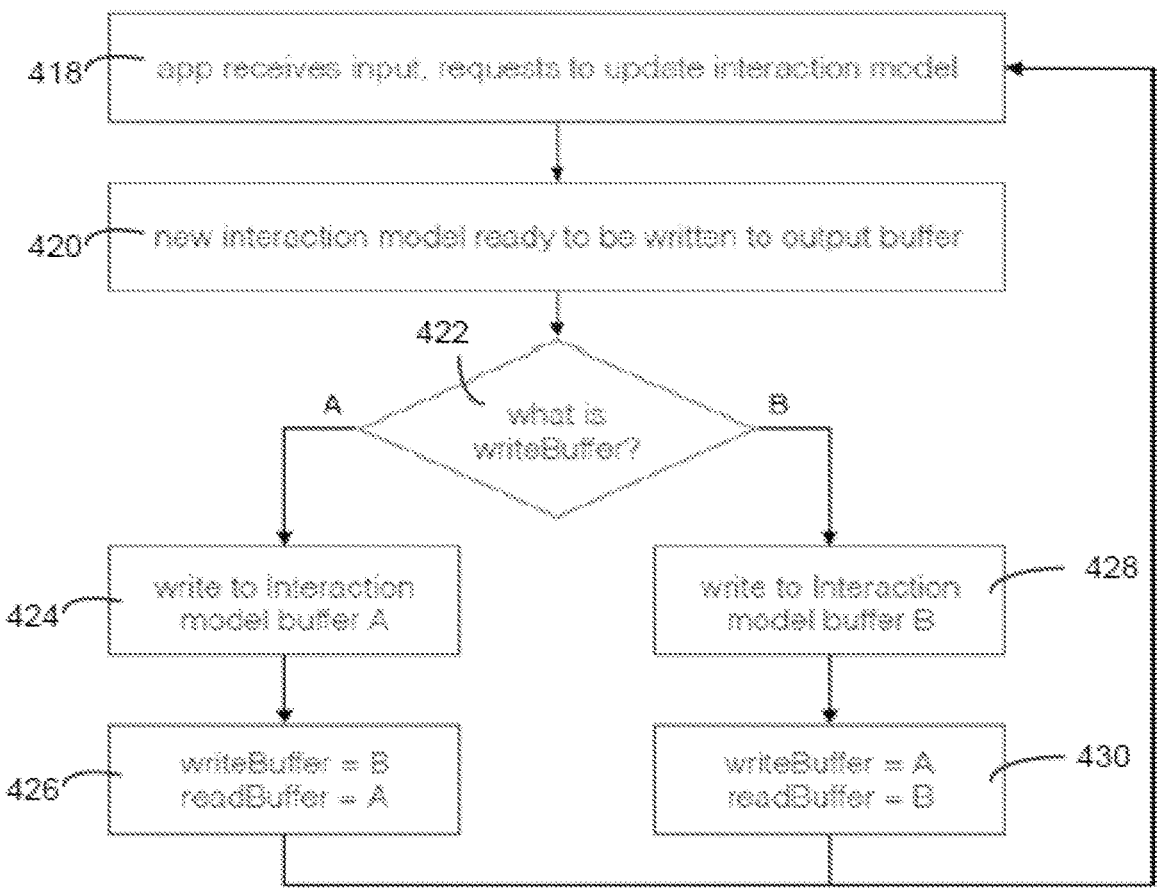
FIGS. 6A and 6B depict schematic diagrams of the operation of a process executed by a memory management module for updates to an interaction model that ensures continuous haptic operation and the operation of a process executed at the driver layer with respect to an updated interaction model.
Figure 6B:
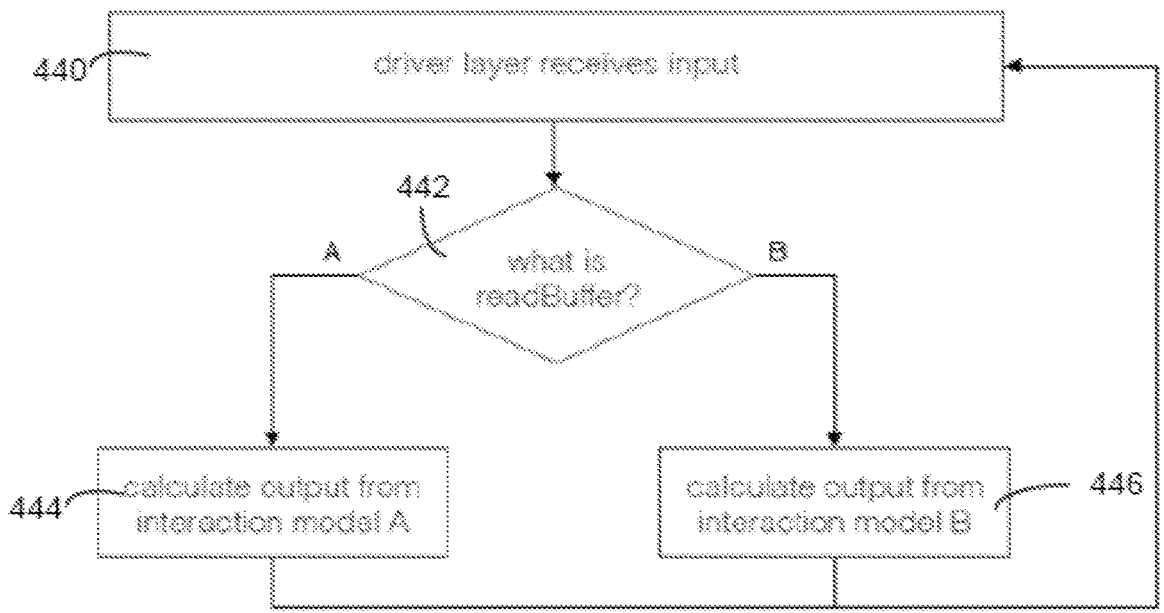

FIGS. 6A and 6B depict schematic diagrams of the operation of a process executed by a memory management module to enable asynchronous (i.e., arbitrarily-timed) updates to the interaction model without interfering with the haptic control loop so that there is continuous haptic operation and the operation of a process executed at the driver layer with respect to an updated interaction model. This ensures the integrity of the haptic interaction in the event of misbehaving (or dead-locked) applications. In this embodiment, a multiple buffer is preferably implemented, such as, for example, two buffers, one of which is safe for reading at all times, and one of which is safe for writing. In this way, the architecture guarantees that haptic output will be correctly computed at all times, regardless of the asynchronous updates from the application. A hardware-timed circuit may be useful with the output signal.

FIG. 6A is a schematic diagram of the further operation of the process of step 418 from FIG. 5, duplicated as the first step of this FIG. 6A. In step 420, the new interaction model is prepared to be written to an output buffer. In step 422, the process determines, based upon other operational factors, whether buffer A or buffer B is to be the "write buffer". As previously mentioned, the buffer that is not the write buffer will be the "read buffer." If buffer A is selected to be the write buffer, then in step 424 the new interaction model will be written to buffer A. In step 426, buffer B is set as the write buffer and buffer A as the read buffer for the next iteration of this process when requested. If buffer B is selected to be the write buffer, then in step 428 the new interaction model will be written to buffer B. In step 430, buffer A is set as the write buffer and buffer B as the read buffer for the next iteration of this process when requested.

FIG. 6B is a schematic diagram of the further operation of the process of step 408 from FIG. 5. In step 440, the driver layer receives the input then in step 442 determines which buffer is the read buffer. If the read buffer is buffer A, then in step 444 the interaction model stored in buffer A is used to calculate the output for the actuator. If the read buffer is buffer B, then in step 446 the interaction model stored in buffer B is used to calculate the output for the actuator with a hardware-timed circuit.

Figure 7:
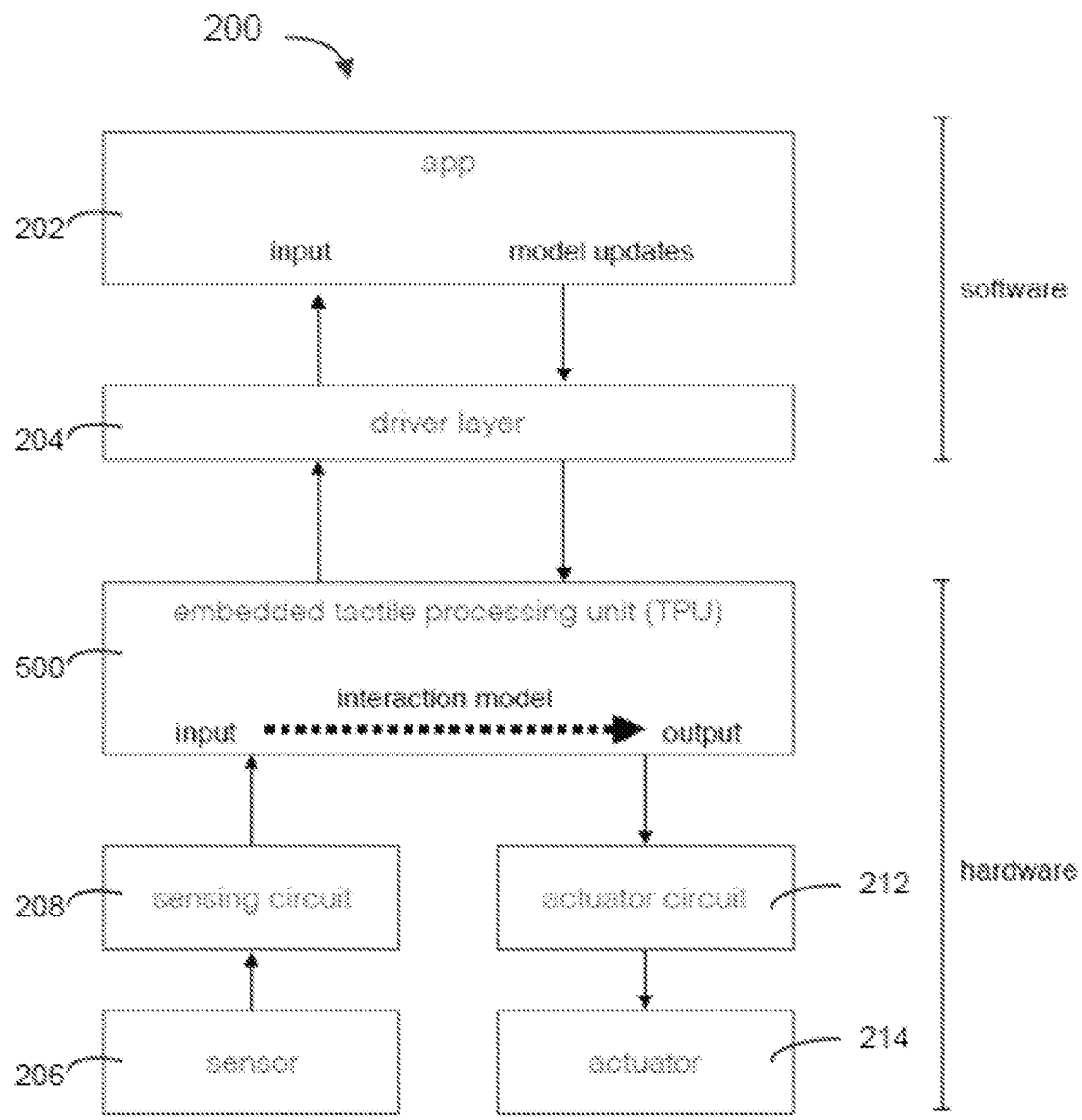
FIG. 7 schematically depicts another embodiment of a haptic interface unit consistent with the present disclosure, using a multi-rate processing unit in a tactile processing unit (TPU).

FIG. 7 schematically depicts another embodiment of a haptic interface unit 200 consistent with the present disclosure. The haptic interface includes the application 202, driver layer 204, sensor 206, sensing circuit 208, actuator circuit 212 and actuator 214, and a tactile processing unit 500 in communication with the application 202 and the driver layer 204. Consistent with this embodiment, the tactile processing unit 500 is a hardware implementation that contains both a dedicated soft computing core as well as custom-designed hardware circuitry that receives input signals and generates output signals, e.g., a hardware-timed circuit. After generation of the haptic output signal from the embedded processor 500, the tactile processing unit 500 communicates with the application 202 via the driver layer 204 and the application 202 updates the interaction models in the tactile processing unit 500 via the driver layer 204.

Figure 8:
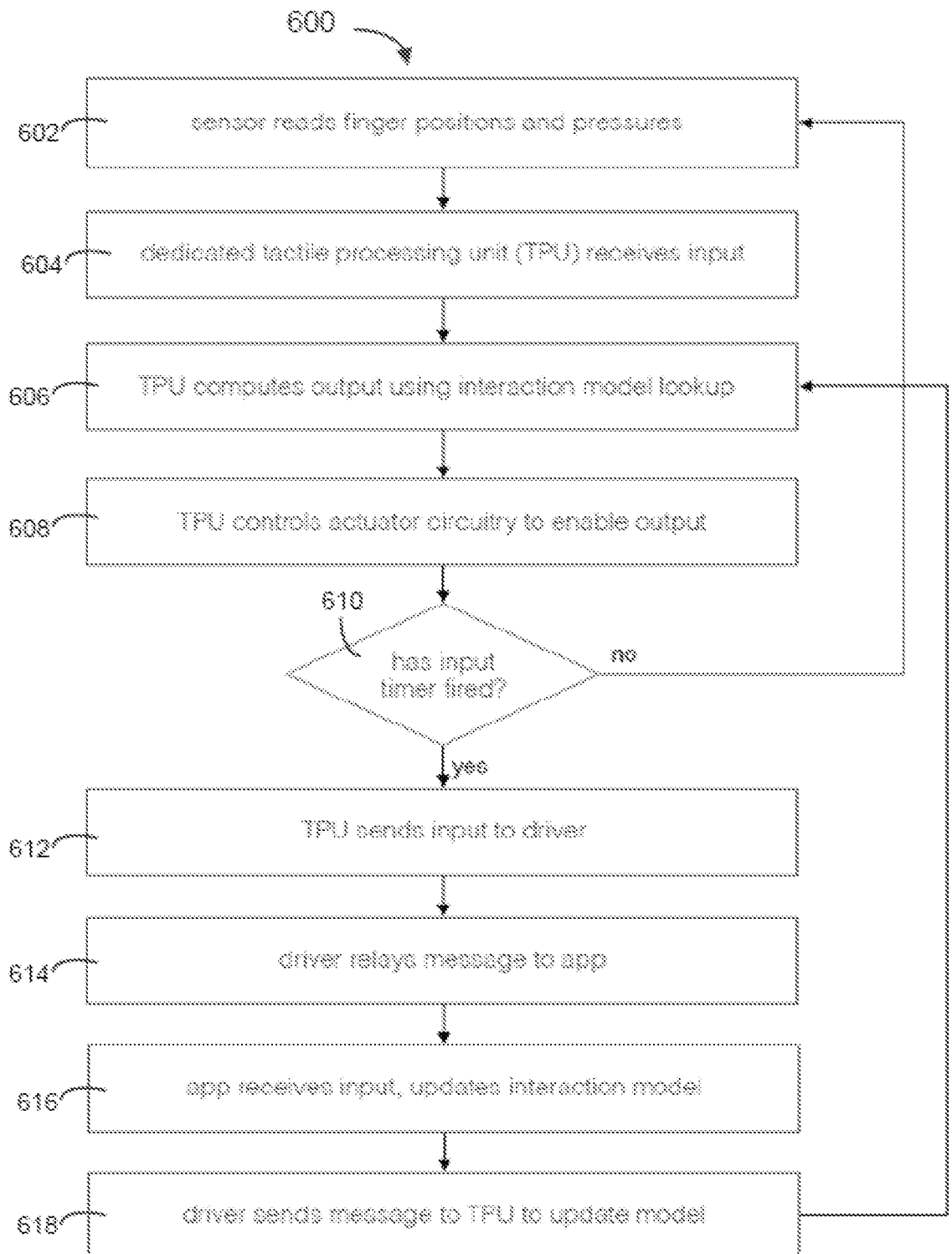
FIG. 8 depicts a schematic representation of a process operated by the haptic interface of FIG. 7.

FIG. 8 depicts a schematic representation of a process operated by the haptic interface 600 of FIG. 7. In step 602, the sensor 206 reads finger positions and/or pressures. In step 604, the sensor 206 transmits the positions and/or pressures via the sensor circuitry 208 to the tactile processing unit 500 which processes the positions and/or pressures. In step 606, the tactile processing unit 500 determines a haptic output signal based on an interaction model stored in the tactile processing unit 500. In step 608, the tactile processing unit 500 transmits the haptic output signal to the actuator 214 via the actuator circuitry 212. In step 610, the tactile processing unit 500 determines if an input timer in the memory of the tactile processing unit 500 has expired. If the input timer has not expired, the tactile processing unit 500 reads more sensor information. In step 612, if the input timer has expired, the tactile processing unit 500 transmits the position and/or pressure information to the driver layer 204. In step 614, the driver layer 204 formats the position and/or pressure information and transmits the formatted information to the application layer. In step 616, the application 202 updates the interaction models based on the received pressures and/or positions. In step 618, the application 202 sends the updated interaction models to the tactile processing unit 500 via the driver layer 204.

The process depicted in FIG. 8 is another embodiment of a multi-rate processing architecture. In this embodiment, the tactile processing unit 500 uses specialized hardware-timed circuitry to perform step 604, 606 and 608, and can achieve update rates in excess of 20 kHz, which is enough to span the entire audible range of frequencies. With a hardware-timed output, computation delays are predictably negligible, and complex haptic interactions like those emulating physical systems can be reliably rendered.

As a result of step 618, the tactile processing unit 500 receives interaction model updates asynchronously from the application layer 202 through the driver layer 204. The available communication bandwidth and task scheduling limit these update rates to about 1 or 2 kHz. Specialized memory management in the tactile processing unit 500, such as multiple buffering as previously described herein, ensures the hardware-timed output always accesses memory that is complete and valid.

Figure 9:
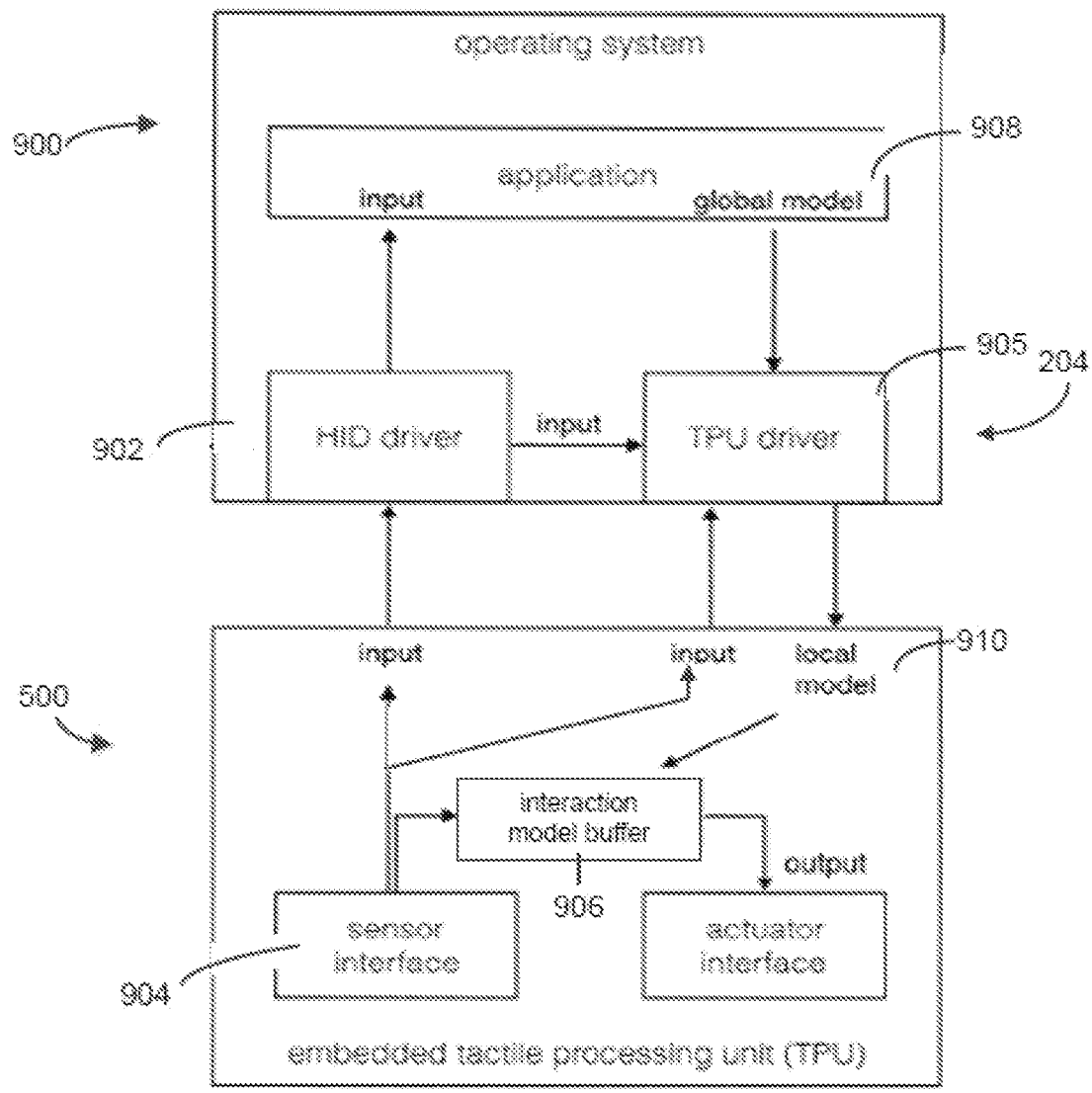
FIG. 9 schematically depicts an embodiment of a dual-function haptic interface unit consistent with the present disclosure, that serves as both a Human Input Device (HID) and haptic interface.

FIG. 9 schematically depicts an embodiment of a dual-function haptic interface unit consistent with the present disclosure, that serves as both a Human Input Device (HID) and haptic interface. In this embodiment, the tactile processing unit 500 may connect to the operating system 900 as dual-function device, serving both as a widely supported Human Input Device input 902 and also as a haptic interface. In this embodiment, the sensor interface 904 (comprising the sensing circuit 208 among other items) sends data obtained from the sensors 206 to the interaction model buffer 906 and to both the HID driver 902 and the haptic interface control driver or TPU driver 905 as well as any other existing drivers present on the operating system driver layer 204. As a result, the driver layer 204 may analyze, predict, compute and generate the touch input data from the HID driver 902 to generate local interaction models based on global interaction models stored in the application. Preferably, in one aspect, a subset of relevant data of the local interaction models may be transmitted to the tactile processing unit 500 in order to accommodate memory constraints in the tactile processing unit 500. Additionally, relevant touch input data and sensor data may be sent to the tactile processing unit 500, so as to satisfy memory constraints in the tactile processing unit 500. In one example embodiment, the driver layer 204 uses the touch input (from the HID 902) to analyze and predict which parts of the global interaction model 908 will be disposed in local proximity to the touch input in the near future and compute and generates a local interaction model 910 to place in the TPU interaction model buffer 906.

Figure 10:
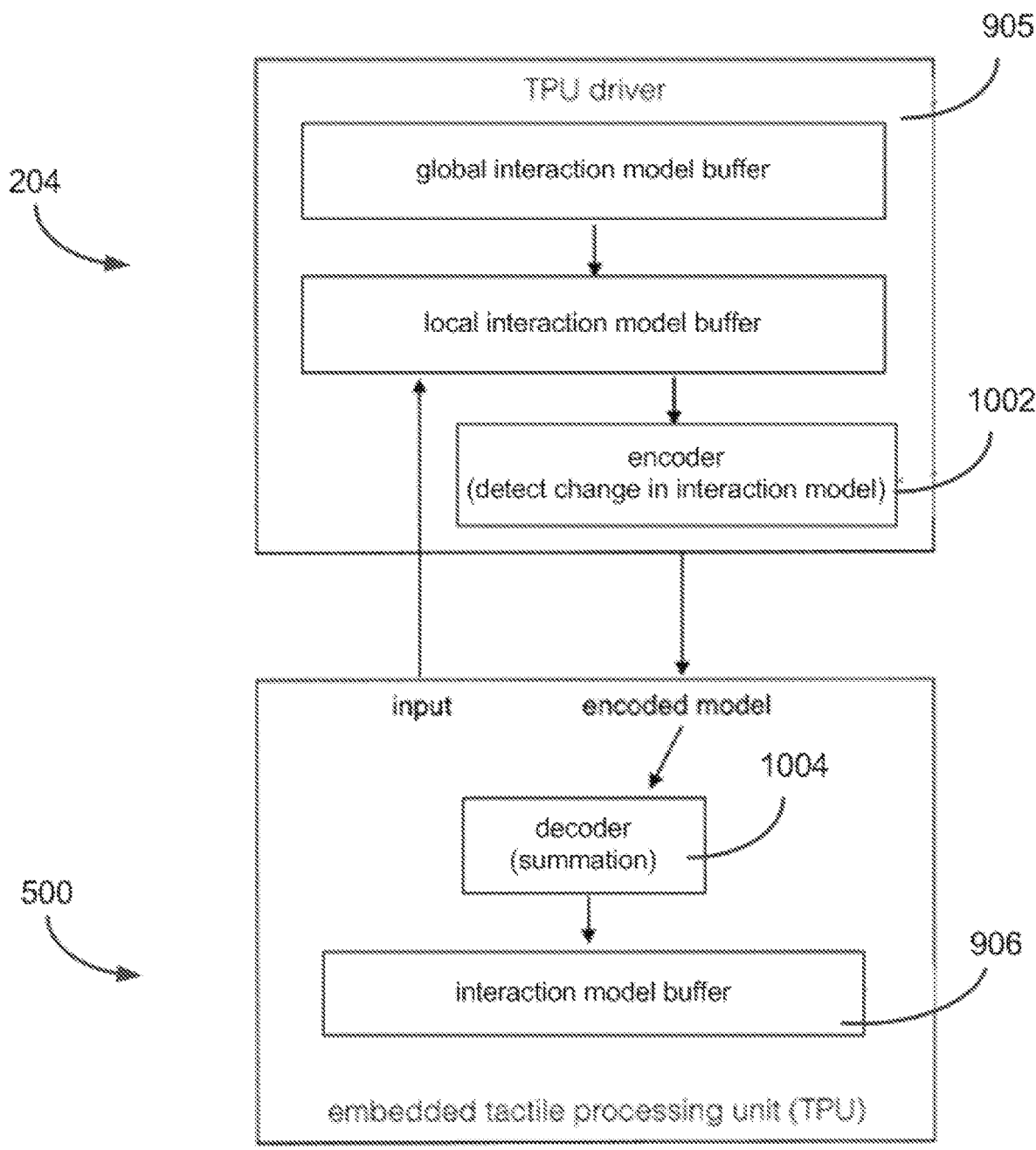
FIG. 10 schematically depicts an embodiment of an encoded communication layer between the driver layer and hardware layer of a haptic interface consistent with the present disclosure.

FIG. 10 schematically depicts an embodiment of an encoded communication layer between the driver layer and hardware layer of a haptic interface consistent with the present disclosure. In this embodiment, the TPU driver 905 of the driver layer 204 may include an encoder 1002 to condense the data of the local interaction models 910 prior to relaying it to the tactile processing unit 500, so as to meet bandwidth limitations imposed by the communication bus. In one embodiment, the encoder 1002 only sends relevant data, changes or deltas in local interaction models parameters. A decoder 1004 on the tactile processing unit 500 interprets the encoded data prior to providing it to the interaction model buffer 906 for use by the hardware-timed haptic control loop and interface as described herein for real-time rendering.

In the present disclosure, the words "a" or "an" are to be taken to include both the singular and the plural. Conversely, any reference to plural items shall, where appropriate, include the singular.

It should be understood that various changes and modifications to the presently preferred embodiments disclosed herein will be apparent to those skilled in the art. Such changes and modifications can be made without departing from the spirit and scope of the present disclosure and without diminishing its intended advantages. It is therefore intended that such changes and modifications be covered by the appended claims.

The foregoing examples have been provided merely for the purpose of explanation and are in no way to be construed as limiting of the present inventive concepts disclosed herein. While the inventive concepts have been described with reference to various embodiments, it is understood that the words, which have been used herein, are words of description and illustration, rather than words of limitation. Further, although the inventive concepts have been described herein with reference to particular means, materials and embodiments, the inventive concepts are not intended to be limited to the particulars disclosed herein; rather, the inventive concepts extend to all functionally equivalent structures, methods and uses, such as are within the scope of the appended claims. Those skilled in the art, having the benefit of the teachings of this specification, may affect numerous modifications thereto and changes may be made without departing from the scope and spirit of the inventive concepts in its aspects.

Any other undisclosed or incidental details of the construction, function or composition of the various elements of the disclosed embodiments of the present inventive concepts are not believed to be critical to the achievement of the advantages of the present inventive concepts, so long as the elements possess the attributes needed for them to perform as disclosed. Certainly, one skilled in the haptic arts would be able to conceive of a wide variety of structural and functional systems and configurations and successful combinations thereof in order to facilitate and implement the inventive concepts. The selection of these and other details of construction and operation are believed to be well within the ability of one of even rudimental skills in this area, in view of the present disclosure. Illustrative embodiments of the present inventive concepts have been described in considerable detail for the purpose of disclosing a practical, operative structure and functionality whereby the inventive concepts may be practiced advantageously. The embodiments described herein are intended to be exemplary only. The novel characteristics of the inventive concepts may be incorporated in other structural or functional forms without departing from the spirit and scope of the inventive concepts. The inventive concepts encompass embodiments both comprising and consisting of the elements described with reference to the illustrative embodiments. Unless otherwise indicated, all ordinary words and terms used herein shall take their customary meaning as defined in The New Shorter Oxford English Dictionary, 1993 edition. All technical terms shall take on their customary meaning as established by the appropriate technical discipline utilized by those normally skilled in that particular art area.

The invention claimed is:

1. A haptic interface unit including:
an application operating in a device and an embedded tactile processing unit;
wherein the application includes a global interaction model,
wherein the embedded tactile processing unit is in communication with the application,
wherein the embedded tactile processing unit includes a local interaction model and is configured to produce a haptic output signal to an actuator based on the local interaction model and sensor data input from a plurality of sensor, that corresponds to an appendage of a user disposed on a surface of the device,
wherein the embedded tactile processing unit includes a hardware-timed circuit;
wherein the application updates the local interaction model on the embedded tactile processing unit based on the global interaction model and timing that is asynchronous with the production of the haptic output signal to the actuator.

2. The haptic interface of claim 1, wherein the plurality of sensors sense a position of the appendage of the user on the surface.

3. The haptic interface of claim 1, wherein the plurality of sensors sense a pressure applied to the surface by the user.

4. The haptic interface of claim 1, wherein the embedded tactile processing unit is a hardware implementation that contains both a dedicated soft computing core and the hardware-timed circuit.

5. A method of operating a haptic interface comprising a plurality of sensors, a plurality of actuators, an application, a tactile processing unit, the method comprising the steps of:
reading sensor information corresponding to an appendage of a user on a surface from at least one of the plurality of sensors;
transmitting the sensor information to the tactile processing unit;
processing the sensor information with hardware-timed circuitry in the tactile processing unit to determine a haptic output signal based on a local interaction model stored in the tactile processing unit;

transmitting the haptic output signal from the tactile processing unit to the actuator in accordance with the hardware-timed circuitry of the tactile processing unit;

determining when an input timer of the tactile processing unit has expired in accordance with the hardware-timed circuitry of the tactile processing unit;

reading more sensor information corresponding to the appendage of the user on the surface from at least one of the plurality of sensors when the input timer is not expired;

transmitting the sensor information from the tactile processing unity to the application when the input timer is expired in accordance with the hardware-timed circuitry of the tactile processing unit;

updating a global interaction model in the application based on the sensor information received from the tactile processing unit; and asynchronously updating the local interaction model based on the global interaction model asynchronously received by the tactile processing unit without interfering with the tactile processing unit processing sensor information.

6. The method of claim 5, wherein the sensor information includes a position the appendage of the user on the surface.

7. The method of claim 5, wherein the sensor information includes a pressure of the appendage of the user on the surface.

8. The method of claim 5, wherein a rate of asynchronously updating the local interaction model is less than 1 kHz.

9. The method of claim 5, wherein a rate of transmitting the haptic output signal is greater than 20 kHz.

* * * * *